Oct. 23, 1962    F. D. GREENLEAF ETAL    3,059,310
AXMINSTER LOOM-SPOOL SETTING APPARATUS
Filed Feb. 16, 1960    7 Sheets-Sheet 1

INVENTORS
FRANCIS D. GREENLEAF
JOHN T. Mac ISAAC, JR.
FRANK W. BREY
BY
ATTORNEYS

Oct. 23, 1962  F. D. GREENLEAF ETAL  3,059,310
AXMINSTER LOOM-SPOOL SETTING APPARATUS
Filed Feb. 16, 1960  7 Sheets-Sheet 2

INVENTORS
FRANCIS D. GREENLEAF
JOHN T. Mac ISAAC, JR.
FRANK W. BREY
BY
ATTORNEYS

Oct. 23, 1962    F. D. GREENLEAF ETAL    3,059,310
AXMINSTER LOOM-SPOOL SETTING APPARATUS
Filed Feb. 16, 1960    7 Sheets-Sheet 4

INVENTORS
FRANCIS D. GREENLEAF
JOHN T. Mac ISAAC, JR.
FRANK W. BREY
BY
ATTORNEYS

Oct. 23, 1962     F. D. GREENLEAF ETAL     3,059,310
AXMINSTER LOOM-SPOOL SETTING APPARATUS
Filed Feb. 16, 1960     7 Sheets-Sheet 5

INVENTORS
FRANCIS D. GREENLEAF
JOHN T. Mac ISAAC, JR.
FRANK W. BREY
BY
ATTORNEYS

Oct. 23, 1962  F. D. GREENLEAF ETAL  3,059,310
AXMINSTER LOOM-SPOOL SETTING APPARATUS
Filed Feb. 16, 1960  7 Sheets-Sheet 6

INVENTORS
FRANCIS D. GREENLEAF
JOHN T. Mac ISAAC, JR.
FRANK W. BREY
BY
ATTORNEYS

Oct. 23, 1962 F. D. GREENLEAF ETAL 3,059,310
AXMINSTER LOOM-SPOOL SETTING APPARATUS
Filed Feb. 16, 1960 7 Sheets-Sheet 7

INVENTORS
FRANCIS D. GREENLEAF
JOHN T. MacISAAC, JR.
FRANK W. BREY

ATTORNEYS

United States Patent Office 3,059,310
Patented Oct. 23, 1962

3,059,310
AXMINSTER LOOM-SPOOL SETTING APPARATUS
Francis D. Greenleaf, Syosset, N.Y., John T. MacIsaac, Jr., Spray, N.C., and Frank W. Brey, Omaha, Nebr., assignors to Cutler-Hammer, Inc., Milwaukee, Wis., a corporation of Delaware
Filed Feb. 16, 1960, Ser. No. 9,076
28 Claims. (Cl. 28—55.5)

This invention relates to automatic apparatus for setting yarns for Axminster loom-spools and the like.

Looms for making Axminster rugs and carpeting employ loom-spools on which are wound many different color yarns arranged in proper order for the individual tufts of the rug. Commonly one spool, or a limited number of coaxially arranged spools, carry all the yarns for a single row across the width of the rug. Different spools, or spool assemblies, are used for successive rows of tufts until the pattern repeats.

Commonly there are seven tufts per inch in the rug, and consequently seven yarns per inch on the loom-spool. The spool length varies, but is usually from 27 to 54 inches in multiples of nine inches. For wider rugs two or more spools are arranged coaxially. Thus, a 54-inch spool will contain 378 individual yarns arranged along the spool in a color order corresponding to the rug pattern for the corresponding row. The number of different colors employed depends upon the rug design, and may vary from a few to 40 or more. The yarns are all of the same length, commonly 27 to 45 feet, depending upon the quantity of rugs to be produced and the number of repeats in a rug.

The loom-spools are prepared by skilled operators drawing lengths of yarn of the proper colors from supply spools on a large setting table. When all the yarn lengths have been drawn from the supply spools and arranged in proper order on the setting table, the ends are attached to an empty loom-spool and wound thereon. This is a very time-consuming and costly operation.

There have been proposals in the past for automatic or semi-automatic equipment for setting yarns in order to eliminate the manual labor involved. To date such equipment has not been adopted in the rug making industry, at least to a significant degree. In these proposals supply spools of yarn of all the different colors used in the rug are required to be available for each tuft position. Thus for a 54 inch loom spool in 40 different colors, 15,120 supply spools in operating position would be required. For a smaller number of colors, the total number of supply spools is reduced, but at the expense of limiting the versatility of the apparatus.

It is a primary object of the present invention to provide apparatus for setting yarns for loom-spools automatically in a manner which is practical and which is capable of use with a large number of different colors without requiring an excessive number of supply spools to be simultaneously available.

In accordance with the broad aspects of the invention, a plurality of yarn storage means are provided for storing lengths of yarn in position for winding on a loom-spool. A distributor is supplied with yarns of the different colors to be utilized and distributes the proper color yarn to the storage means in sequence. Means are provided to control the distribution so that each of the plurality of storage means contains the proper color yarn for the corresponding position on the loom-spool.

Advantageously a bed of tubes is employed for storing the yarn lengths in proper order, and supply tubes are employed to feed the different color yarns to the distributor. Then pneumatic (compressed air) launchers are employed to convey the yarns through the supply tubes to the distributor, and through yarn feeding paths sequentially established by the distributor to the proper storage tubes.

When all storage tubes have been filled with yarns in the proper color order, the yarns may be attached to an empty loom-spool and wound thereon. Then yarns may be set in the storage tubes for the next loom-spool and the operation repeated.

By the use of sequential distribution, only a single set of supply spools, containing yarns of the number of colors to be utilized, is required for a large number of storage tubes. To avoid excessively large distributors, and to reduce the time required to set yarns for a given loom-spool, a number of simultaneously operating distributors, each with its own set of supply spools and storage tubes, may be employed.

Several different kinds of distributors are described hereinafter which have different operating advantages, and may be employed as meets the requirements of the particular application.

Advantageously the setting apparatus is controlled by a coded record, such as a perforated roll of paper, prepared by an operator from a rug design chart with the aid of suitable equipment, and means for accomplishing this are described hereinafter.

The invention will be more fully understood from the following description of specific embodiments thereof, taken in conjunction with the drawings in which.

Figures 1, 2:
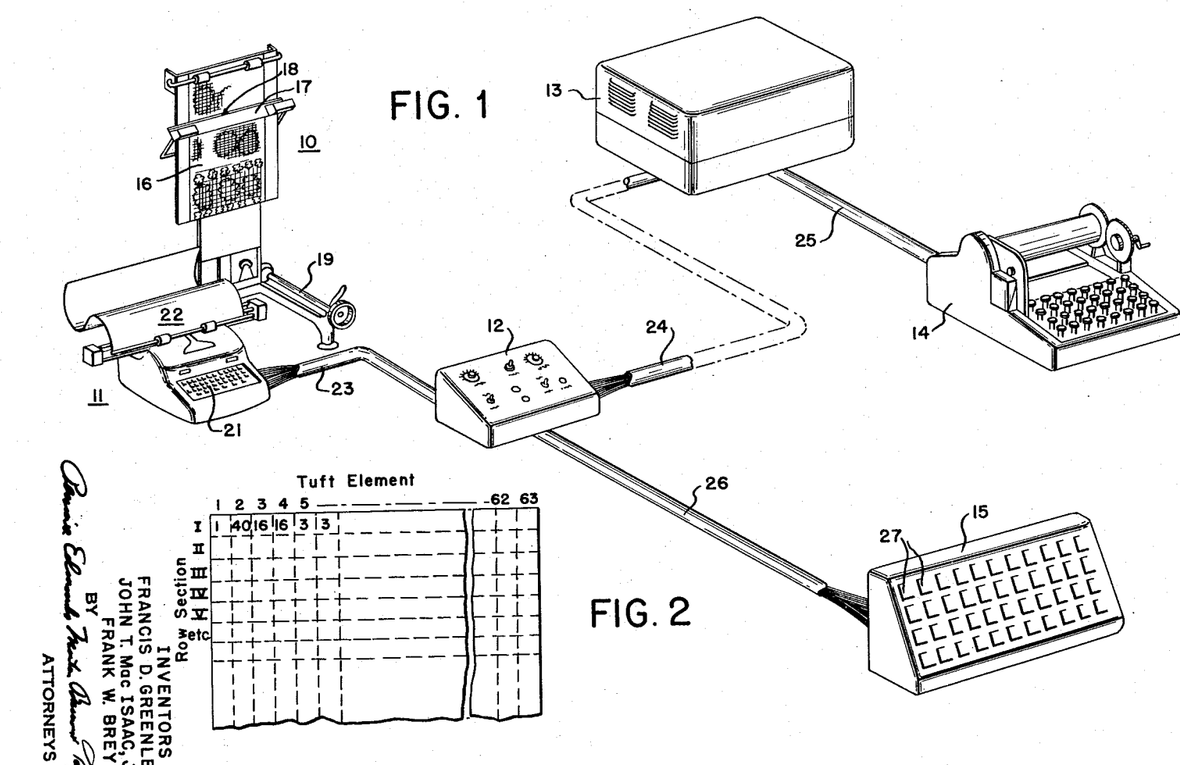
FIG. 1 shows an arrangement for perforating paper rolls in accordance with a design chart.
FIG. 2 illustrates a portion of the check-chart prepared by the apparatus of FIG. 1.

Referring to FIG. 1, several interconnected units are shown including a design reader 10, a modified electric typewriter 11, a control unit 12, a roll reader and perforator control unit 13, a roll perforator 14 and a yarn totalizer 15.

The design reader is similar to a copy reading stand and has provision for holding a conventional rug design chart 16 thereon. A vertical traveling straight edge 17 indicates each horizontal line of the design, and a traveling pointer 18 moves along the straight edge to indicate each tuft of the design to the operator.

The movement of the straight edge 17 from one horizontal line to the next may be controlled manually by suitable mechanism generally shown at 19. The movement of pointer 18 along the straight edge is interlinked mechanically or electrically with the keyboard operation of typewriter 11.

The keys 21 of the typewriter actuate key bars in normal manner to print corresponding characters on a check sheet 22. Numerical, alphabetical or arbitrary characters can be employed to record the color appearing in the corresponding tuft element of the rug design chart. As pointer 18 moves along the design, the operator reads the color designation for that element and presses the corresponding key on the typewriter. Thus, when a row of tuft elements along the design chart has been read, a corresponding row of characters will be printed on sheet 22, thus enabling verification of the design coding.

FIG. 2 illustrates a chart resulting from the above procedure. Here rows I, II, etc. correspond to successive rows of the rug design chart 16. Columns 1, 2, etc. correspond to successive tuft elements along the respective rows. Numerals in the boxes, such as 1, 40, 16, etc. represent the particular colors corresponding to the respective tuft elements. The width of the design chart may be selected as desired, and the width of the typewriter carriage chosen accordingly. However, it is convenient to employ design charts representing a fraction of the overall rug width, say 9 inches. With 7 tufts per inch there will be 63 coded elements in each row of the design chart, and therefore in the corresponding check chart as illustrated in FIG. 2.

In this specification illustrative numerical values will frequently be given for convenience and clarity of explanation. However, it will be understood that the invention is not limited thereto.

The keys 21 are arranged to supply corresponding signals through control box 12 to the perforator control unit 13 which actuates roll perforator 14. Any desired perforation coding may be employed, but here it is assumed to be a six-place binary code, giving sixty-four possible combinations. Only forty need be used for forty colors, but others may be used for control purposes, etc.

As here shown, depressing a given key sends a signal through a corresponding wire in cable 23, control unit 12 and cable 24 to the perforator control unit 13. Coded signals are then sent through cable 25 to roll perforator 14 which punches the proper coding perforations in the corresponding elementary area of the paper roll. It is possible to arrange the typewriter 11 so that the depression of each key sends corresponding coded impulses to the control unit 13 for actuating perforator 14. In such case fewer interconnecting lines may be required.

The wires in cable 23 are connected in control unit 12 to wires in cable 26 leading to corresponding elements in the yarn totalizer 15. Suitable counters may be actuated in unit 15 and the total number of tufts of each color yarn made visible through windows 27. Thus the total amount of yarn of each color required in producing the rug is given by the yarn totalizer, or may be calculated therefrom. This is very useful for subsequent production control.

The perforated roll initially prepared by perforator 14 may be termed a master roll. It may be desirable to prepare a number of copies for use in different setting machines or for subsequent production purposes. Thus unit 13 advantageously contains a roll reader in which the master roll can be placed. Control unit 12 may be arranged to disconnect typewriter 11 during roll duplication, and supply control signals from the roll reader in unit 13 direct to the perforator 14. On the other hand, impulses from the roll reader 13 may be supplied through control unit 12 to typewriter 11 and totalizer 15. The keys in typewriter 11 may be arranged to be actuated by such control signals, as by means of solenoids, so that a check chart is prepared therefrom. Simultaneously, the amount of yarn of each color may be totalized in unit 15.

The details of the components of FIG. 1 will be obvious to those skilled in the art and further description is believed unnecessary.

Figures 3, 4:
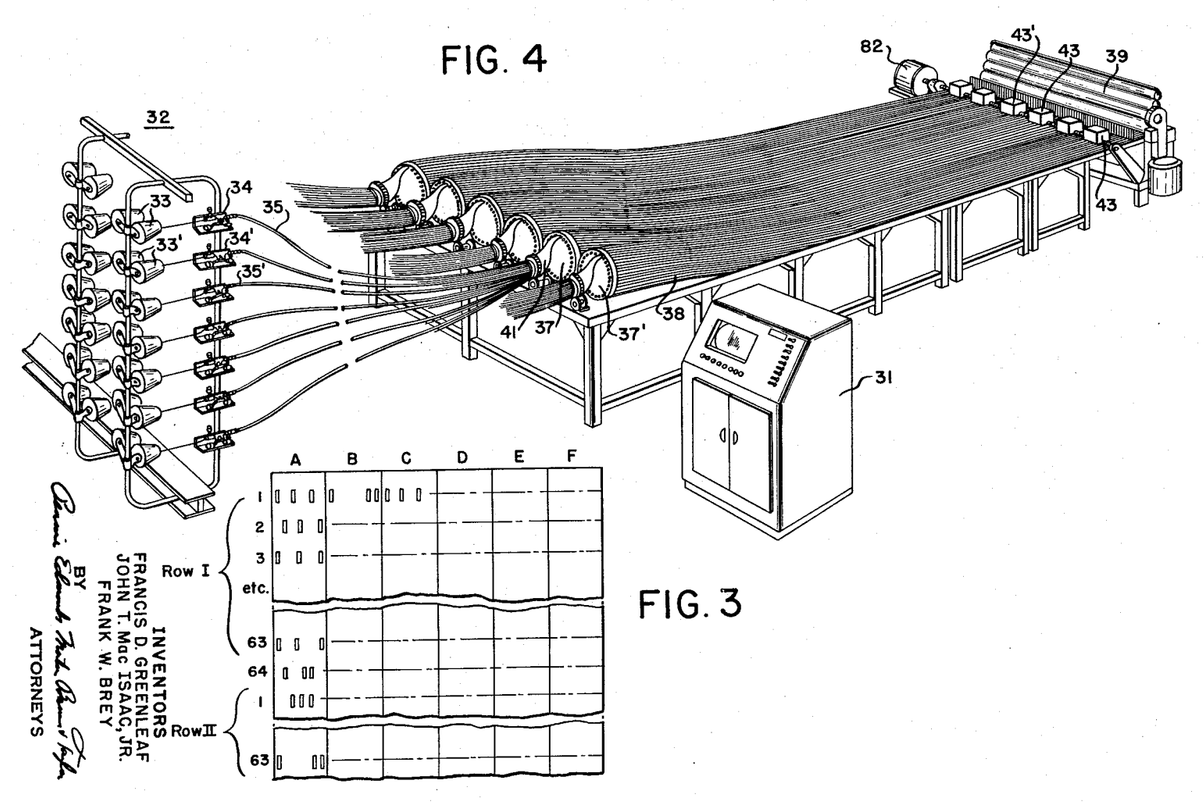
FIG. 3 illustrates a portion of a paper roll with coded perforations for controlling an automatic yarn setting machine.
FIG. 4 is a simplified view of an automatic setting machine employing a funnel-type of distributor.

Referring now to FIG. 3, a perforated roll suitable for controlling the apparatus of FIG. 4 is illustrated. It is here assumed that yarns are to be set for a 54" loom-spool and that columns A, B . . . F correspond to 9" sections of the spool. Column sections may be separately prepared by perforator 14 of FIG. 1 and then joined together side by side. Or, preferably, a single roll is fed through perforator 14 the necessary number of times, and the columns perforated one after the other in proper horizontal alignment.

Column A illustrates one 9" section in which the coded perforations representing the color of successive tuft elements 1, 2, 3 . . . 63 are recorded vertically corresponding to row I of the rug design. The next elemental area 64 may be coded for control purposes. Then the color coded perforations for elements 1–63 in row II are recorded and so on for successive rows. Column B gives the codings for the tuft elements in the adjacent 9" section of the rug and so on through column F. Thus row 1 will contain in horizontal alignment color codes corresponding to the first elements in row I of each section of the 54" spool. Similarly for rows 2, 3, etc.

Referring now to FIG. 4, a general overall view of the automatic yarn setting apparatus of the invention is illustrated. Certain details are omitted due to the scale of the drawing, and they will be shown in subsequent figures.

A control console 31 is shown containing a roll reader and control circuits to be subsequently explained in connection with FIG. 9. The console is interconnected with the setting apparatus, as will be explained, but the interconnections are omitted in FIG. 4 to avoid confusion.

In the setting equipment yarns are conveyed pneumatically from one point to another by enclosing the yarns in respective small tubes and blowing them therethrough by compressed air. A plurality of supply sources of yarns of different colors are provided. The construction here takes the form of a magazine creel 32 with cone pairs of yarn 33, 33', etc. arranged in a manner known in the art. The yarn from each cone pair is fed through a corresponding yarn launcher assembly 34, 34', etc. and supply tube 35, 35', etc. to the inlet section of one of a plurality of distributors 37, 37', etc. The outlet section of each distributor is connected to a plurality of storage tubes 38 which forms a storage bed terminating at the loom-spool winder 39.

The number of storage tubes fed by each distributor 37, 37', etc. may be selected as desired but is here assumed to be 63 tubes corresponding to 9 inches of rug width with 7 tufts per inch. Six distributors are shown giving a total of 378 storage tubes corresponding to a 54" loom-spool. By reducing the number of distributors employed at any one time, yarns can be set for shorter loom-spools. Each distributor is supplied with the number of differently colored yarns required for the particular rug pattern. Assuming that 40 colors are to be employed, with six distributors there will be 240 cone pairs of yarn mounted on the creel.

Considering one distributor 37, the corresponding rotatable funnel 41 will be stepped from one storage tube to the next in sequence. At each step one launcher 34, 34' corresponding to the proper color yarn for that storage tube will be actuated to blow the yarn through the distributor and the storage tube to the far end of the latter. Yarn detectors 43, 43', etc. are located at the far end of the storage-tube bed to detect the presence of the yarn from each distributor when it reaches that point. As here illustrated, the yarn detector is a photoelectric cell and supplies an impulse through the control unit 31 to stop the launcher 34. Thereupon, the funnel 41 is moved to the next storage tube. As it moves, the funnel is arranged to cut the yarn previously stored. The launcher assembly 34 has provision for retracting the supply end of the yarn from the distributor so that it does not impede the passage of the next yarn to be stored if that should happen to be a different color. Further description of the operation will be deferred until certain mechanical features have been explained.

Figure 5:
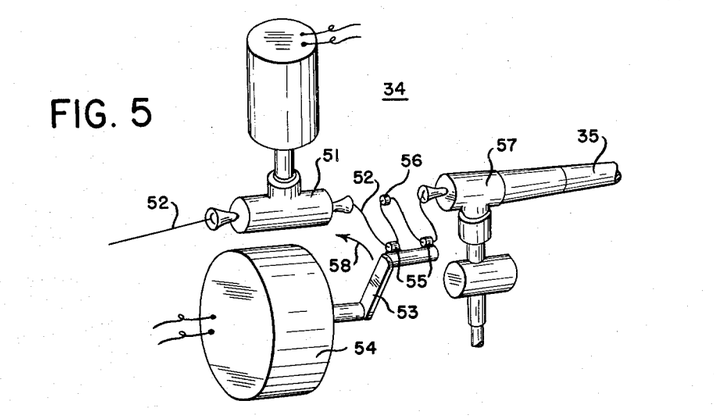
FIG. 5 is a detail of the yarn-launcher assembly used in the apparatus of FIG. 4.

Referring to FIG. 5, a yarn launcher assembly 34 is illustrated including a solenoid actuated clamp 51 through which yarn 52 from one of the supply cones passes. A yarn retractor is shown in the form of a crank 53 actuated by a rotary solenoid 54. The yarn passes through eyelets 55 on the crank and a stationary eyelet 56 to the inlet of an air gun 57 connected to supply tube 35. In the position shown a length of yarn has been retracted corresponding to the convolutions passing through the eyelets. When the retractor is moved to its forward position, as indicated by the arrow 58, the eyelets 55 will be aligned with eyelet 56, the outlet of clamp 51 and the inlet of launcher 57, so that the yarn passes therethrough with no excess length.

Figure 6:
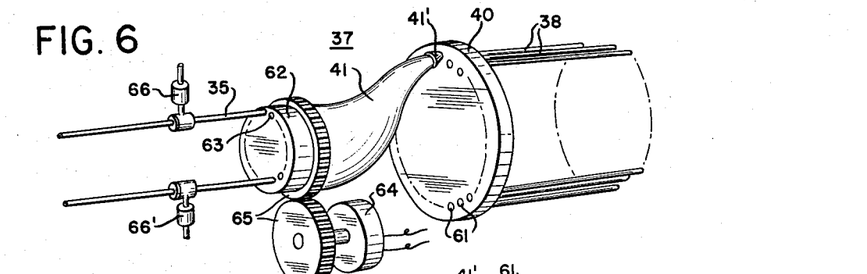
FIG. 6 is a detail showing the funnel distributor of FIG. 4 on a larger scale.

Referring to FIG. 6, one funnel distributor is shown comprising an outlet face plate 40 having a plurality of outlets 61, a step-rotating offset funnel 41, and an inlet member 62 having a plurality of inlets 63 therein. The funnel is step-rotated by suitable means such as the step motor 64 and gears 65.

Outlets 61 are arranged in a circular pattern and connected with the inlet ends of the storage tubes 38. The number of outlets may be selected as desired, but it is here assumed that there are 63, thus giving reasonable mechanical dimensions and corresponding to 9″ of rug width. Inlets 63 are connected with respective yarn supply tubes 35. The number is selected to correspond to the number of different color yarns which the apparatus is designed to accommodate. It is here assumed that there are forty supply tubes to accommodate forty different color yarns.

The inlets are shown arranged in a circle, but different configurations are possible inasmuch as in the embodiment shown it is unnecessary for a rotating member to have an aperture which passes over the inlets in succession. Each inlet tube is provided with a valve 66, 66' of suitable construction for closing off the respective tube, such as a solenoid-operated pinch valve. By opening the proper pinch valve and keeping the remainder closed, a yarn feeding path is established from the selected inlet supply tube through the funnel to the outlet with which the end 41' of the funnel is in registry. As the funnel is step-rotated, yarn feeding paths are successively established from selected inlets to selected outlets.

As will be explained hereinafter, the establishment of yarn feeding paths to the proper inlets is primarily accomplished by the yarn launcher assemblies 34, 34' rather than by the pinch valves. The principal function of the pinch valves is to close off all supply tubes except the one in use so as to prevent compressed air in the distributor funnel from blowing yarns back in the supply tubes not in use. This might impair or prevent proper feeding in subsequent steps.

Figure 7:
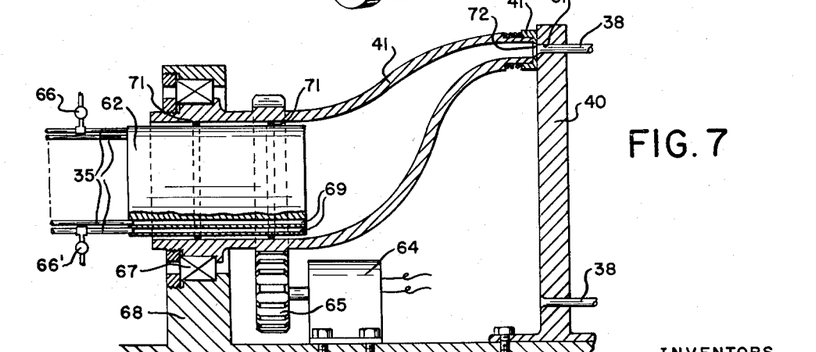
FIG. 7 is a cross-section of the funnel distributor of FIG. 6.

FIG. 7 illustrates certain details of the funnel distributor of FIG. 6. As shown, funnel 41 is arranged for rotation in a bearing 67 mounted in a suitable support 68. Inlet member 62 is stationary and has a plurality of inlet holes 69 therethrough corresponding to the yarn supply tubes 35. Sealing rings 71 are provided to prevent compressed air in the funnel from escaping around member 62. In order to assure a fairly air-tight path from the funnel to the outlets, the tip 41' is advantageously made separate and spring-pressed against outlet plate 40 as shown. When a yarn length has been stored in a given storage tube 38, it is necessary to cut it so that the same color yarn can be fed to subsequent storage tubes as required by the rug design. Accordingly, in this embodiment the tip 41' is provided with a knife edge at 72 so that the yarn is cut as the funnel tip moves to the next outlet.

Figures 8, 9:
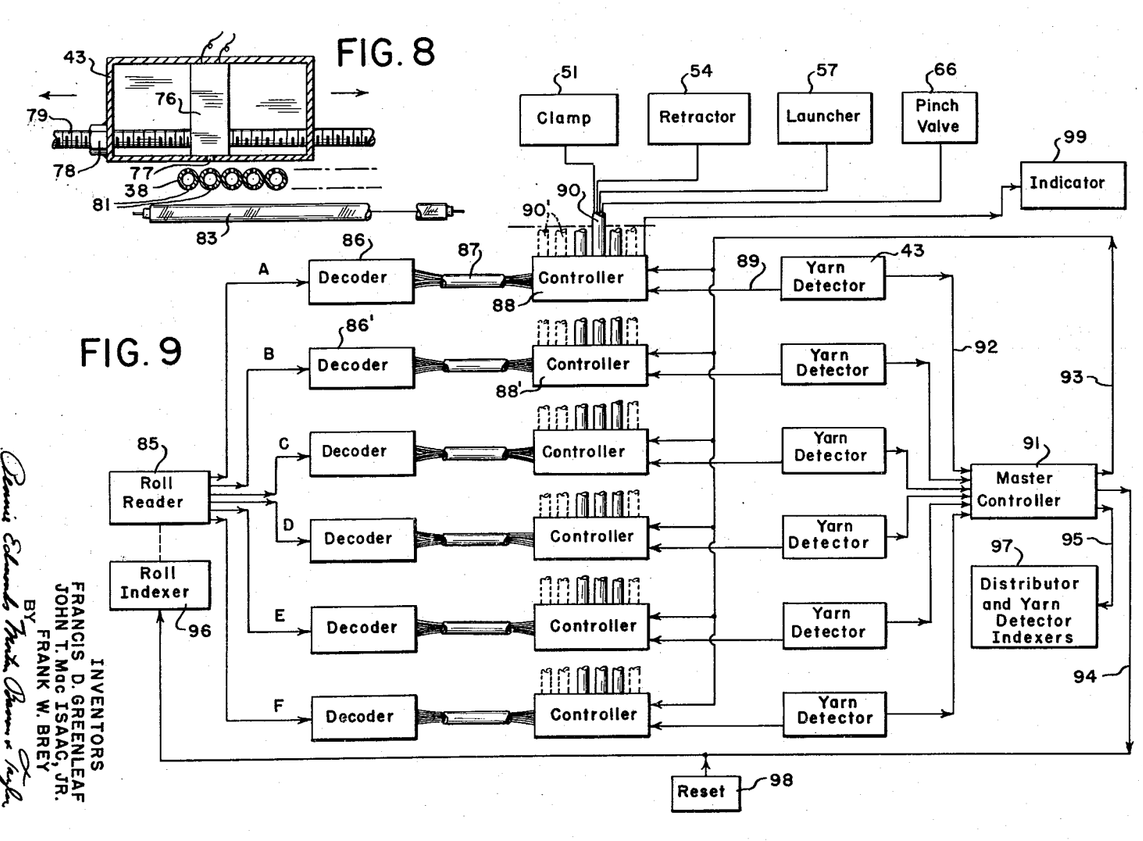
FIG. 8 is a detail showing a photoelectric yarn detector used in the apparatus of FIG. 4.
FIG. 9 is a block diagram illustrating suitable control equipment for the apparatus of FIG. 4.

Referring now to FIG. 8, a photoelectric yarn detector is shown. The detector comprises a housing 43 having unit 76 containing a photoelectric cell and suitable optical system mounted therein. The housing has a small aperture 77 through which light can be admitted to the photoelectric cell. Threaded nut 78 is affixed to the housing so that rotation of lead screw 79 moves the aperture 77 into the registry with successive storage tubes 38. The storage tubes have diametric holes 81 therein and an extended light source 83 is positioned below the holes. Thus, when the aperture 77 in the housing is in registry with the diametric hole in one of the storage tubes, light passes therethrough to the photoelectric cell. When a yarn end passes by a hole 81, it partially or completely cuts off the light and gives a resultant change in response of the photoelectric cell.

As seen in FIG. 4, there are a plurality of yarn detectors corresponding in number to the yarn distributors. They are located near the outlet ends of the storage tubes so as to give signals when full yarn lengths have been stored in respective tubes. The several housings 43, 43', etc. are mounted on a common lead screw driven by a step motor 82 so that proper synchronization is obtained.

If desired, the outlet ends of the storage tubes may be flattened to accommodate a sufficient number of tubes per inch, arranged in a staggered double row, etc.

Referring now to FIG. 9, a control system for controlling the apparatus of FIGS. 4–8 is illustrated. A roll reader 85 is provided in which a perforated roll such as shown in FIG. 3 is inserted. In a given position, say row 1, the roll reader will send signals representing the color of the first tuft element in each of sections A, B . . . F to decoders 86, 86', etc. in respective channels of FIG. 9. Six similar channels are shown and only channel A will be described in detail.

Decoder 86 interprets the coded signals from the roll reader 85 and supplies a signal through the proper line in cable 87 to controller 88. The controller is arranged to supply control signals through cable 90 to clamp 51, retractor 54, yarn launcher 57 and pinch valve 66 in the supply line 35 containing yarn of the proper color. For signals from the decoder corresponding to other color yarns, the controller sends control signals to corresponding units in other supply lines through other cables 90'.

The control signals are adapted to open clamp 51, move rectractor 54 to its aligned position, open pinch valve 66 and energize launcher 57. Thus the yarn is conveyed through the corresponding distributor to the storage tube with which the funnel tip is then in registry. When the yarn reaches the outlet end of the storage tube the yarn detector 43 produces a signal which is supplied to controller 88 through line 89, and also to a master controller 91 through line 92. The signal through line 89 actuates suitable means in the controller to close clamp 51 and cut off launcher 57, thereby stopping further feed of the yarn.

The yarn must be cut before the supply end can be retracted, and in this embodiment the cutting is performed by stepping the funnel to the next storage tube. To maintain proper synchronization so that successive storage of yarns by the several distributors takes place in proper relationship with respect to the perforated roll, in this embodiment the funnel distributors are simultaneously stepped to their next positions and the yarn detectors simultaneously stepped to their next positions. There may be a slight difference in the time of travel of the yarns in the several channels A . . . F so that the corresponding yarn detectors may not be actuated simultaneously.

Accordingly, in FIG. 9 the outputs of all the yarn detectors are supplied to the master controller 91. When signals have been received from all yarn detectors, corresponding signals are supplied through line 93 to the controllers 88, 88', etc. through line 94 to roll indexer 96, and through line 95 to the distributor and yarn detector indexers 97. The indexers shown by block 97 are the several step motors 64 which drive corresponding funnels 41 in the several channels, and step motor 82 for indexing the yarn detectors to the next storage tubes. Roll indexer 96 moves the perforated roll to the next row, say from 1 to 2, or 2 to 3, etc. in FIG. 3.

Reset 98 is provided so that an operator can manually step the roll reader to its next position. Thus, after the storage tubes have been filled and the stored yarn lengths wound on a loom-spool, actuating the reset will advance the perforated roll to the beginning of the next row, say II, of the rug pattern and storage of yarn lengths for the next loom-spool will begin. Indicator 99 may be provided to signal the operator when the storage tubes have been filled and actuated by a coded signal as shown in row 64 of FIG. 3.

Figure 10:
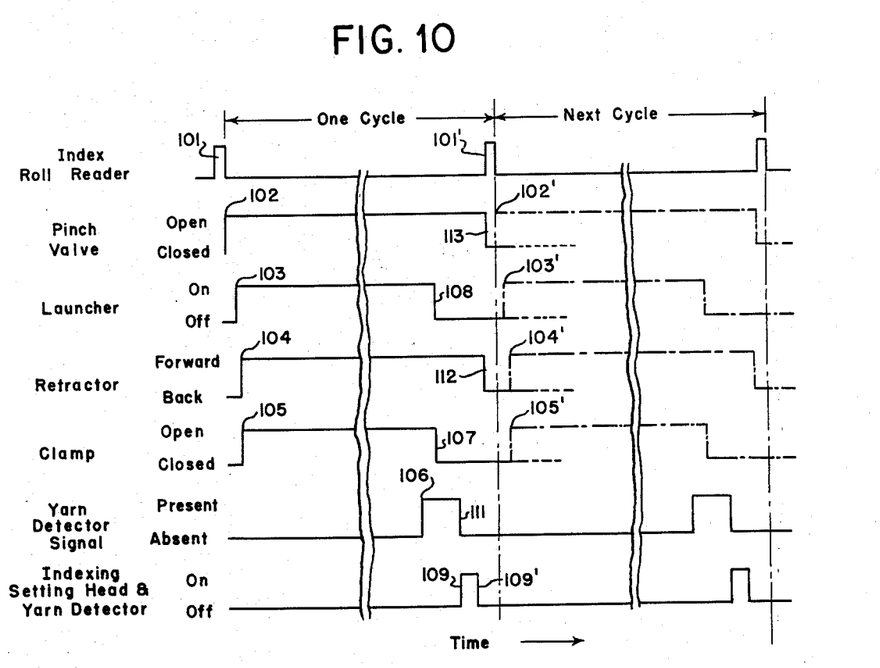
FIG. 10 is a timing diagram for the control equipment of FIG. 9.

The timing of the various operations in the apparatus of FIG. 9 may be best understood by reference to FIG. 10.

FIG. 10 shows two successive cycles of operation corresponding to the two successive rows of perforations, say 1 and 2, in FIG. 3. The timing diagrams apply primarily to the operation of a single channel of FIG. 9, but certain functions are common to all channels.

A signal 101 to the roll indexer 96 starts a cycle. Initially the signal may be obtained from reset 98, and subsequently from the master controller 91. The roll indexer initially moves the roll reader to the first row 1 (FIG. 3) of the perforated roll, and from one row to the next for subsequent operations. A corresponding signal from roll reader 85 representing the desired color yarn passes through decoder 86 to the controller 88 which sends a signal to pinch valve 66 to open the valve, as shown at 102. Slightly thereafter the controller sends a signal to launcher 57 to turn the launcher on, as indicated at 103. Simultaneously with, or slightly after the energizing of the launcher, the controller sends signals to retractor 54 moving it toward its forward (aligned) position, as indicated at 104, and to open clamp 51, as indicated at 105.

The exact timing described so far can be varied as meets the requirements of a given apparatus, taking into account the response times of the several components. In general it is desirable to open the pinch valve slightly before energizing the corresponding launcher, to avoid any danger of the yarn piling up in the supply tube. Also, it is desirable to control the initial acceleration and velocity of the yarn so that it passes through the distributor properly. The pulling force of the air on the yarn will be greater in the restricted cross-sections of the supply and storage tubes than in the larger cross-section of funnel 41. Thus too rapid an acceleration in the supply tube may cause the yarn to pile up in the funnel. Once the yarn end has passed into the storage tube, high velocities can be attained.

Friction in eyelets 55, 56 of the retractor when out of alignment will decrease yarn acceleration, so that completion of the movement into the aligned position may be delayed until the yarn end has entered the storage tube. Also, clamp 51 may be designed to provide some friction on the yarn during the opening thereof.

Instead of generating signals in controller 88 with slight delays therebetween, the launcher, retractor and clamp may have suitable built-in delays so that they may be controlled, along with the pinch valve, by a single signal from the controller.

It is assumed that initially the distributor funnel is in registry with the outlet to the first storage tube. Consequently the yarn will travel down the storage tube until it reaches the outlet end thereof and actuates the corresponding photoelectric yarn detector. The yarn detector then gives a signal as illustrated at 106. This signal is supplied through line 89 to controller 88 which then sends a signal to clamp 51 to close it, as indicated at 107. This positively prevents further feeding of the yarn through that storage tube so that a uniform length of yarn is stored. Simultaneously, or slightly thereafter, the controller sends a signal to launcher 57 turning it off, as indicated at 108.

The yarn detector signal is also sent to the master controller 91 which, when signals from all yarn detectors have been received, generates an indexing control signal as shown at 109. This indexes all distributors to the next storage tubes, respectively, and also indexes the yarn detectors to the next storage tubes. Since these tubes are empty, the yarn detector signal terminates, as indicated at 111. The indexing of the distributors cuts the yarn at the inlet ends of the storage tubes, so that the supply end can be withdrawn. Accordingly, the master controller 91 sends a slightly delayed signal to the controller through line 93, as indicated at 112, and the controllers move all retractors to their retracted positions, thereby withdrawing the yarns somewhat from the corresponding distributors.

The amount of retraction is selected so that the free end of the supply yarn will not interfere with the feeding of a different yarn through the distributor on the next operation. For example, in FIG. 7 the retraction may bring the free yarn end into one of tubes 69. It will be noted from FIG. 4 that the launcher assemblies 34 are at a substantial distance from the distributors 37. Thus, after retraction, a considerable length of yarn remains in the supply tube 35. This provides sufficient pneumatic drag for rapid acceleration and conveying of the yarn in that supply tube when it is next required.

As soon as the yarn is retracted the controller sends a signal to pinch valve 66 to close the valve, as indicated at 113. This closes the corresponding supply tube so that, if the perforated roll calls for a different color yarn in the next cycle, pneumatic pressure in the distributor will not blow the yarn back into the supply tube, thus interferring with subsequent feeding of that yarn when required. The master controller 91 also sends a signal to the roll indexer as indicated at 101', thereby indexing the perforated roll to the next row.

The signal 109 developed in the master controller may be arranged to have a substantially fixed duration and the trailing edge 109' thereof arranged to send a signal to the controller 88 for actuating the retractor and pinch valve. Or, the leading edge 109 may send the signal directly, and suitable delays incorporated in the signals sent out by the controller 88, or in the operation of the retractor and pinch valve.

As soon as the perforated roll has moved to the next row, new signals are sent to respective decoders and controllers. These may call for the same or different color yarns to be stored in the next storage tubes. The second cycle in FIG. 10 presupposes that a different color yarn is called for. Accordingly, the pinch valve, launcher, retractor and clamp in the previous supply line remain in the condition just described, and the corresponding components in the newly selected supply line are actuated as indicated at 102', 103', 104' and 105'. Dot-dash lines are used to indicate that the elements correspond to a different supply line.

This procedure continues automatically until all storage tubes associated with each distributor are filled with yarn in the selected sequence determined by the perforated roll. When this point is reached, the apparatus may be stopped in any desired manner. For example, an additional row of perforations in the paper roll may be used to shut off power, or the row left blank so that no signals are sent to the decoders and controllers, or an operator on duty may shut off power etc. When an additional row of perforations is used, distributors 37 may be provided with an additional position which is blank on the outlet side, so that a subsequent step aligns them with their first storage tubes respectively.

The stored yarn lengths may be withdrawn from the outlet ends of the storage tubes and wound on the loom-spool with the aid of an operator in conventional manner, or suitable automatic means may be provided for the purpose. To facilitate the operation, a segregating comb may be located at the outlet end of the storage tube bed.

It is desirable that the yarn lengths extend a few inches beyond the outlets of the storage tubes so that they are accessible for winding on the loom-spool. A slight delay in the photoelectric cell response or in closing clamp 51 may be introduced for this purpose. FIG. 10 indicates a slight delay between the actuation of the detector at 106 and the closing of the clamp at 107.

After the loom-spool has been wound, reset 98 may be actuated to start the storage of yarn lengths corresponding to the next row II of the rug.

The circuits in the various units of FIG. 9 may take many forms, as will be obvious to those skilled in the art. Decoders 86 may include relays for establishing proper output circuits in accordance with the coded input signals. The controllers 88 may employ relays, stepping switches, electronic switches, cam timers, etc. to develop the proper output signals. Hold circuits for the clamp, retractor, etc. may be provided when required to hold them in their final positions at the end of a cycle until that color yarn is next required. The master controller may utilize relays actuated by respective yarn detectors, with relay contacts connected in series to establish a circuit only when all relays are actuated. The series circuit in turn may be used to energize other relays to develop the corresponding output signals.

Many modifications in the control arrangement may be made to secure proper sequence of operation of the various components of FIG. 4.

Figure 11:
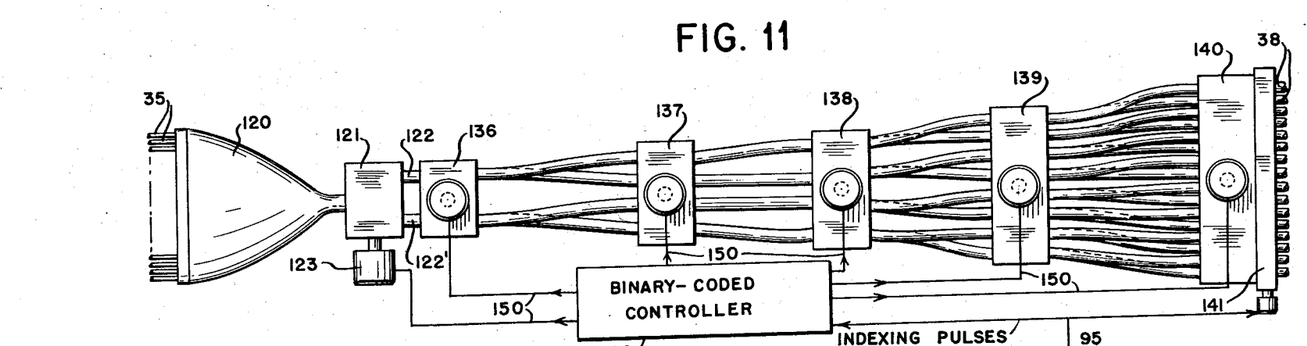
FIG. 11 is a plan view of a different type of distributor.
Figure 12:
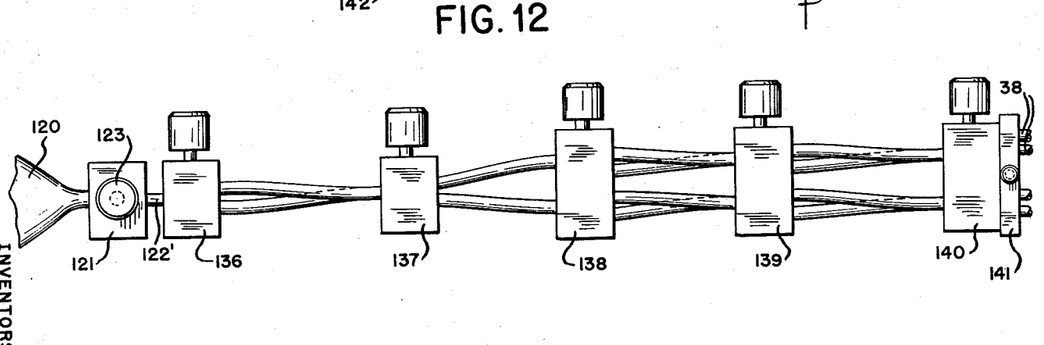
FIG. 12 is a side view of the distributor of FIG. 11.

Referring now to FIGS. 11 and 12, a different type of distributor is shown. Here the inlet section is similar to that of the funnel distributor. Yarn supply lines 35 lead into a funnel-like input chamber 120 having an outlet connected to the inlet of valve 121. A selected supply tube is rendered operative in the manner previously described and feeds a corresponding yarn to the input of valve 121. This is a valve operable to connect its input to either of two output tubes 122, 122'. Advantageously it is actuated by a solenoid 123. The outputs of valve 121 lead to other valves, each of which provides two output lines for each input.

Figure 13:
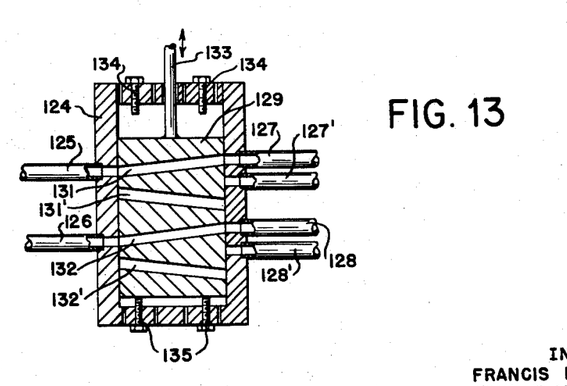
FIG. 13 is a cross-section of a representative valve unit used in the distributor of FIGS. 11 and 12.

FIG. 13 is a detail showing a suitable valve structure which may be employed. As shown, FIG. 13 has two valve sections connected to respective input lines. A housing 124 contains two inlets 125, 126 and corresponding outlet pairs 127, 127' and 128, 128'. A slider 129 has slightly diagonal passages 131, 131' and 132, 132'. A shaft 133 is attached to the slider and may be actuated by suitable means, such as a solenoid, to an upward position determined by stops 134 and a lower position determined by stops 135. In the lower position shown, inlet 125 is connected to outlet 127, and inlet 126 to outlet 128. As will be evident, with the slider in its upper position, inlet 125 will be connected through passageway 131' to outlet 127', and inlet 126 through 132' to outlet 128'. Additional valve sections may be provided either below those shown, or side-by-side therewith.

Returning to FIGS. 11 and 12, a series of valve units 136—140 are employed with the inlets of each valve unit corresponding in number to the outlets of the preceding valve unit and connected thereto. The arrangement is analogous to a binary code and, with the six valve units shown, the input to valve 121 may be connected to any one of sixty-four outlets of valve unit 140. Sixty-three of these outlets may be connected to storage tubes 38 and the remaining one unused.

In feeding a yarn through tubes and valves, it is desirable to avoid too great a change in angle since this impairs proper feeding of the yarn and may produce undue wear on the tube walls and valves. Consequently, the spacing between valve units, and the dimensions and angles in the valve units themselves may be chosen with this in mind. Also, various combinations of horizontal and vertical arrangements of valves assist in reducing overall length without excessively abrupt changes in angle.

As specifically shown, the first valve unit 121 contains one valve arrangement of FIG. 13, with the outlet tubes horizontal and the slider moving horizontally. The second unit 136 has two valve units arranged side-by-side horizontally, rather than vertically as shown in FIG. 13. The slider moves vertically as indicated. Unit 137 has four valves arranged side-by-side horizontally. Valve units 138, 139 and 140 have two vertically spaced rows of four, eight and sixteen valves in a row, respectively. All valves in a given unit have a single slider operated by a single solenoid.

The distributor of FIGS. 11 and 12 may be used in the arrangement of FIG. 4 in lieu of the rotating funnel distributor. The supply tubes 35 will be connected and operated as before described. Instead of relying upon step rotation of the funnel to cut the yarn after a length has been stored, a suitable solenoid-operated cutting mechanism 141 may be arranged at the outlet of valve unit 140 and actuated by the indexing pulse 109 (FIG. 10). A binary coded stepping relay may be actuated by the indexing pulses, the relay contacts being connected to valves 121, 136—140 to actuate the valves so that yarn feeding paths from the inlet of valve 121 to successive outlets of valve 140 are sequentially established. Thus a binary-coded controller 142 is shown which receives indexing pulses through line 95 and delivers output control signals through lines 150 to the solenoids of the valve units. Also, the indexing pulses are supplied to the solenoid of cutting mechanism 141.

Instead of using a conical input 120 in FIG. 11, it is possible to employ an additional set of branching valves and interconnections oppositely disposed from that shown, so that any one of a plurality of input supply lines can be connected selectively to a single output which in turn is connected to valve 121. Such an arrangement could be supplied with the binary signals from the roll reader to establish a path for the proper colored yarn. Similarly, in FIG. 4, each distributor could have two offset funnels back-to-back, and independently rotatable. The input funnel could be stepped by the decoded signals to the proper input supply tube. The input arrangements illustrated are considered preferable because of their greater simplicity.

Figure 14:
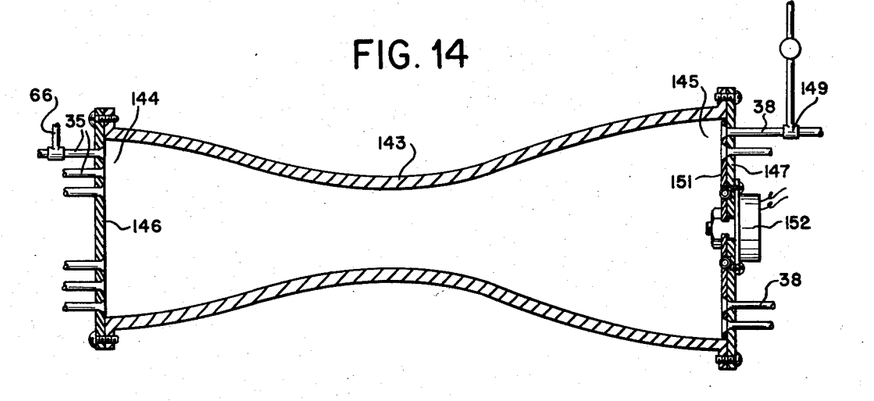
FIG. 14 is a cross-section of a different type of distributor.

Referring to FIG. 14, another type of distributor is illustrated having a chamber 143 tapering from the inlet end 144 to the center and then flaring outwards to the outlet end 145. A plate 146 is attached to the housing 143 at the inlet end and yarn supply tubes 35 terminate therein. Pinch valves 66 are employed in each of the supply tubes as before.

The output end 145 has a plate 147 attached thereto in which are mounted the inlet ends of storage tubes 38. Here additional valves 149, such as pinch valves, are provided, one for each storage tube. A yarn cutting mechanism is provided in the form of a rotary plate 151 with holes registering with the storage tubes 38 in one position, and rotatable through a small angle by a step motor 152 to cut a yarn in any one of the outlet holes.

With all inlet valves 66 closed except for one, and all outlet valves 149 closed except for one, compressed air flows through chamber 143 from the selected supply tube 35 to the selected storage tube 38. With an appropriate shaping of the funnel section 143 the yarn end entering through the selected supply tube will tend to follow the line of air flow and enter the selected storage tube. This is not as positive a guide for the yarn as in the previous embodiments, but may be found satisfactory in some cases.

The manner of controlling the distributor of FIG. 14 will be understood from the foregoing discussion. One additional factor may be mentioned. It is desirable to open inlet and outlet valves 66, 149 and start the corresponding launcher sufficiently in advance of releasing the retractor and clamp 51 so that pressure is built up in chamber 143 and a relatively smooth line of air flow established. In this embodiment it is particularly desirable to control the initial yarn acceleration so that the yarn threads through the distributor at relatively low velocity until it is well within the storage tube.

Figure 15:
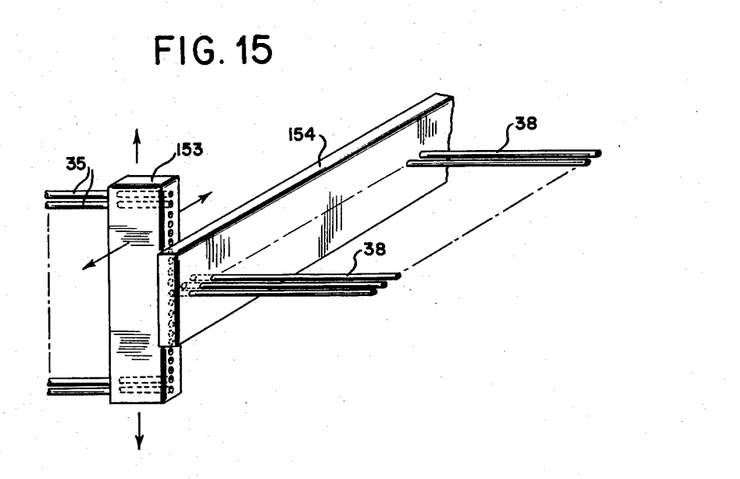
FIG. 15 illustrates another type of distributor.

FIG. 15 shows still another type of distributor in which the supply tubes 35 are connected to a vertical row of apertures in block 153 as indicated. Block 153 is arranged for horizontal and vertical movement along the face of stationary block 154, and the supply tubes are made flexible to permit these movements. Block 154 has outlets therein arranged in a horizontal row and connected to storage tubes 38. Stepping block 153 in the vertical direction enables the proper color yarn to be selected, and stepping in the horizontal direction delivers the selected yarn to the proper storage tube. Inlet pinch valves 66 may be provided as in FIG. 4 to close off unused supply tubes. On the other hand, stationary block 154 may be extended in the vertical direction so that it closes off all except the supply tube in registry with a storage tube, thus dispensing with the inlet pinch valves.

The cooperating surfaces of members 153 and 154 may be arranged to cut the yarn as block 153 moves to the next outlet. With this type of distributor, the retractors in the yarn launcher assemblies may be dispensed with.

If desired, several rows of inlets or outlets, or both, with appropriate control of the stepping movements in the two directions, could be employed to decrease the overall size of the distributor.

The use of a perforated paper roll has been specifically described as the record of the required setting sequence. However, other forms of record such as magnetic tape may be employed if desired. Or, provision may be made for an operator to read a design chart and insert corresponding control signals into the setting apparatus directly, rather than through a storage medium.

Several types of distributors have been described, and a specific arrangement of control valves, launchers, yarn detectors, etc. with a suitable control system have been described. Other forms of distributors are possible. Also, different detailed arrangements of the other components and the control thereof may be employed as best meets the requirements of a given application.

The mechanical arrangement may be altered, if desired, and the storage bed may be built in sections so that different lengths of yarn may be stored for different loom-spool lengths. Automatic shutdown and other fail-safe features may be provided to the extent considered desirable, in order to stop operation in case of malfunctioning.

Although tube feed and storage with pneumatic drive are especially described and preferred, the sequential distribution feature of the invention may be employed with other types of feed and storage means if desired.

It is preferred to fill the storage tubes successively in the order in which the yarns will be wound on the loom-spool, and change the color yarn as required in filling the tubes. However, it would be possible to modify the system to feed a given color yarn to all storage tubes requiring that color, then feed another color yarn to all storage tubes requiring the second color, etc. until all storage tubes are filled.

These and other modifications are possible within the spirit and scope of the invention.

We claim:

1. Apparatus for setting yarns for Axminster loom-spools and the like which comprises a plurality of supply sources of different color yarn, a plurality of yarn storage means for storing lengths of yarn in predetermined order, a distributor having a plurality of inlets connected with respective yarn supply sources and a plurality of outlets connected with respective yarn storage means, and means for sequentially establishing yarn feeding paths from selected inlets of said distributor through selected outlets thereof to said yarn storage means.

2. Apparatus for setting yarns for Axminster loom-spools and the like which comprises a plurality of supply sources of different color yarns, a plurality of yarn storage means for storing lengths of yarn in predetermined order, a yarn distributor having inlet and outlet sections, means for establishing sequentially yarn feeding paths through the outlet section of said distributor to said plurality of storage means, and means for selectively and sequentially establishing yarn feeding paths from said supply sources through the inlet section of said distributor to the outlet section thereof.

3. Apparatus for setting yarns for Axminster loom-spools and the like which comprises a plurality of supply sources of different color yarns, a plurality of yarn storage means for storing lengths of yarn in predetermined order, a distributor having a plurality of inlets connected with respective yarn supply sources and a plurality of outlets connected with respective yarn storage means, means for sequentially establishing yarn feeding paths from selected inlets of said distributor through selected outlets thereof to said yarn storage means, and means for cutting a yarn fed to a storage means prior to the next feeding thereof.

4. Apparatus for setting yarns for Axminster loom-spools and the like which comprises a plurality of supply sources of different color yarns, a plurality of yarn storage means for storing lengths of yarn in predetermined order, said yarn storage means having respective inlets, a yarn distributor having inlet and outlet sections, means for establishing sequentially yarn feeding paths through the outlet section of said distributor to said plurality of storage means, means for selectively and sequentially establishing yarn feeding paths from said supply sources through the inlet section of said distributor to the outlet section thereof, and cutting means near the inlets of said storage means for cutting the supply end of a yarn fed thereto prior to the feeding of the next yarn.

5. Apparatus for setting yarns for Axminster loom-spools and the like which comprises a plurality of supply sources of different color yarn, a plurality of yarn storage means for storing lengths of yarn in predetermined order, said yarn storage means having respective inlets, a yarn distributor having inlet and outlet sections, means for establishing sequentially yarn feeding paths through the outlet section of said distributor to said plurality of storage means, means for selectively and sequentially establishing yarn feeding paths from said supply sources through the inlet section of said distributor to the outlet section thereof, cutting means near the inlets of said storage means for cutting the supply end of a yarn fed thereto prior to the feeding of the next yarn, and means for retracting the supply end of a cut yarn at least partially from said distributor prior to the feeding of the next yarn.

6. Apparatus for setting yarns for Axminster loom-spools and the like which comprises a plurality of supply sources of different color yarns, a plurality of yarn storage means for storing lengths of yarn in predetermined order, said yarn storage means having respective inlets and outlets, a distributor having a plurality of inlets connected with respective yarn supply sources and a plurality of outlets connected with respective yarn storage means, means for sequentially establishing yarn feeding paths from selected inlets of said distributor through selected outlets thereof to said yarn storage means, means for feeding yarns successively through said sequentially established paths, yarn detector means near the outlet ends of said storage means, and means responsive to said yarn detector means for stopping the feeding of a yarn through the respective storage means.

7. Apparatus for setting yarns for Axminster loom-spools and the like in accordance with a record of the required setting order which comprises record reading means for deriving successive signals corresponding to the desired yarn setting sequence, a plurality of supply sources of different color yarn, a plurality of yarn storage means for storing lengths of yarn, a distributor having a plurality of inlets connected with respective yarn supply sources and a plurality of outlets connected with respective yarn storage means, means for rendering said distributor outlets effective sequentially, and means responsive to said successive signals for controlling the feeding of yarns of corresponding color from said supply sources to the distributor in sequence.

8. Apparatus for setting yarns for Axminster loom-spools and the like in accordance with a record of the required setting order which comprises record reading means for deriving successive signals corresponding to the desired yarn setting sequence, a plurality of supply sources of different color yarn, a plurality of yarn storage means for storing lengths of yarn, a distributor having a plurality of inlets connected with respective yarn supply sources and a plurality of outlets connected with respective yarn storage means, feeding means for feeding yarns from said supply sources through the distributor to said storage means, means for rendering said distributor outlets effective sequentially in substantial synchronism with successive signals from said record reading means, and control means responsive to said successive signals for feeding yarns of corresponding color from said supply means in sequence to store successive yarn lengths in respective storage means.

9. Apparatus for setting yarns for Axminster loom-spools and the like in accordance with a record of the required setting order which comprises record reading means for deriving successive signals corresponding to the desired yarn setting sequence, a plurality of supply sources of different color yarn, a plurality of yarn storage means for storing lengths of yarn, a distributor having a plurality of inlets connected with respective yarn supply sources and a plurality of outlets connected with respective yarn storage means, feeding means for feeding yarns from said supply sources through the distributor to said storage means, means for rendering said distributor outlets effective sequentially in substantial synchronism with successive signals from said record reading means, control means responsive to said successive signals for feeding yarns of corresponding color from said supply means in sequence to store successive yarn lengths in respective storage means, and means for cutting a yarn fed to a storage means prior to the feeding of the next yarn.

10. Apparatus for setting yarns for Axminster loom-spools and the like in accordance with a record of the required setting order which comprises record reading means for deriving successive signals corresponding to the desired yarn setting sequence, a plurality of supply sources of different color yarn, a plurality of yarn storage means for storing lengths of yarn, said yarn storage means having respective inlets and outlets, a distributor having a plurality of inlets connected with respective yarn supply sources and a plurality of outlets connected with respective yarn storage means, said distributor being controllable to establish a yarn feeding path from a selected inlet to a selected outlet thereof, feeding means for feeding yarns from said supply sources through the distributor to said storage means, control means responsive to a signal from said record reading means for controlling said feeding means to feed yarn through a corresponding inlet of said distributor to a storage means, yarn detector means near the outlet ends of said storage means, means responsive to said yarn detector means for stopping the feeding of a yarn through the respective storage means, cutting means near the inlets of said storage means for cutting yarns stored therein, and means for actuating said cutting means, actuating said distributor to another outlet thereof and actuating said reading means to yield a successive signal after the storage of a yarn length in a respective storage means.

11. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, a distributor having inlets connected with respective supply tubes and outlets connected with respective storage tubes, means for sequentially establishing yarn feeding paths through selected inlets of said distributor to selected outlets thereof, and pneumatic means for conveying lengths of yarn from said supply sources to said storage tubes sequentially through said sequentially established feeding paths.

12. Apparatus in accordance with claim 11 in which said distributor comprises a rotatable funnel having a relatively large area inlet and a relatively small area outlet, an inlet member having a plurality of inlets leading to said funnel inlet, and an outlet member having a plurality of outlets therein arranged for successive registry with said funnel outlet as the funnel is rotated.

13. Apparatus in accordance with claim 12 in which said funnel outlet and the outlets in said outlet member have cooperating cutting edges for cutting yarns as the funnel is rotated.

14. Apparatus in accordance with claim 11 in which said distributor comprises a plurality of branching valve units having outlets connected with the inlets of succeeding valve units in sequence, the outlets of the last valve unit being connected with said storage tubes respectively, means providing a passageway from said distributor inlets to a common inlet in the first of said valve units, and means for actuating said valve units to establish yarn feeding paths from said common inlet to any of the outlets of said last valve unit.

15. Apparatus in accordance with claim 11 in which said distributor comprises a casing having spaced inlet and outlet sections, said inlet section containing said inlets connected with the supply tubes and said outlet section containing said outlets connected with the storage tubes, and inlet and outlet valves for preventing air flow through respective inlets and outlets, said means for sequentially establishing yarn feeding paths including means for closing all said inlet and outlet valves except a selected inlet and a selected outlet valve to establish an air stream for conveying a yarn from the selected inlet to the selected outlet.

16. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, said yarn storage tubes having respective inlets, a distributor having inlets connected with respective supply tubes and outlets connected with respective storage tubes, means for sequentially establishing yarn feeding paths through selected inlets of said distributor to selected outlets thereof, pneumatic means for conveying lengths of yarn from said supply sources to said storage tubes sequentially through said sequentially established feeding paths, and cutting means near the inlet ends of said storage tubes for cutting each yarn after the corresponding yarn length is stored.

17. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, said yarn storage tubes having respective inlets, a distributor having inlets connected with respective supply tubes and outlets connected with respective storage tubes, means for sequentially establishing yarn feeding paths through selected inlets of said distributor to selected outlets thereof, pneumatic means for conveying lengths of yarn from said supply sources to said storage tubes sequentially through said sequentially established feeding paths, cutting means near the inlet ends of said storage tubes for cutting each yarn after the corresponding yarn length is stored, and means for retracting the supply end of each yarn after said cutting thereof and prior to the conveying of the next yarn length through said distributor.

18. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, said yarn storage tubes having respective inlets and outlets, a distributor having inlets connected with respective supply tubes and outlets connected with respective storage tubes, means for sequentially establishing yarn feeding paths from selected inlets of said distributor to selected outlets thereof, pneumatic means for conveying lengths of yarn from said supply sources to said storage tubes sequentially through said sequentially established feeding paths, yarn detector means near the outlet ends of said storage tubes for detecting the presence of yarns in respective tubes, and means responsive to said detector means for stopping the conveying of yarns through respective tubes.

19. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, said yarn storage tubes having respective inlets and outlets, a distributor having inlets connected with respective supply tubes and outlets connected with respective storage tubes, means for rendering said outlets effective sequentially, a yarn clamp and pneumatic launcher for each of said supply tubes, selective means for releasing the clamps and energizing the launchers of said supply tubes to convey yarns of selected colors to respective storage tubes through said sequentially effective outlets, yarn detector means near the outlet ends of said storage tubes, means responsive to said detector means for closing said clamps and deenergizing said launchers to stop the conveying of detected yarns respectively, cutting means near the inlet ends of said storage tubes, and means for actuating said cutting means to cut each yarn after the corresponding yarn length is stored.

20. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, said yarn storage tubes having respective inlets and outlets, a distributor having inlets connected with respective supply tubes and outlets connected with respective storage tubes, means for rendering said outlets effective sequentially, a yarn clamp, retractor and pneumatic launcher for each of said supply tubes positioned a substantial distance from the respective distributor inlet, selective means for releasing the clamps and retractors and energizing the launchers of said supply tubes to convey yarns of selected colors to respective storage tubes through said sequentially effective outlets, yarn detector means near the outlet ends of said storage tubes, means responsive to said detector means for closing said clamps and deenergizing said launchers to stop the conveying of detected yarns respectively, cutting means near the inlet ends of said storage tubes, means for actuating said cutting means to cut each yarn after the corresponding yarn length is stored, and means for actuating the retractor corresponding to a cut yarn prior to the conveying of the next yarn length through said distributor.

21. Apparatus for setting yarns for Axminster loom-spools and the like which comprises a plurality of yarn supply tubes for supplying yarns of different color from corresponding yarn supply sources, a bed of yarn storage tubes for storing lengths of yarn in predetermined order, said yarn storage tubes having respective inlets and outlets, a distributor having inlets connected with respective supply tubes and outlets connected with respective storage tubes, means for rendering said outlets effective sequentially, a yarn clamp, retractor and pneumatic launcher for each of said supply tubes positioned a substantial distance from the respective distributor inlet, a valve for each supply tube positioned near the respective distributor inlet, selective means for releasing the clamps, valves and retractors and energizing the launchers of said supply tubes to convey yarns of selected colors to respective storage tubes through said sequentially effective outlets, yarn detector means near the outlet ends of said storage tubes, means responsive to said detector means for closing said clamps and deenergizing said launchers to stop the conveying of detected yarns respectively, cutting means near the inlet ends of said storage tubes, and means for actuating said cutting means, retractors and valves to cut each yarn after the corresponding yarn length is stored and retract and clamp the supply end thereof prior to the conveying of the next yarn length through said distributor.

22. Apparatus for setting yarns for Axminster loom-spools and the like in accordance with a record of the required setting order which comprises a record reader for deriving successive signals corresponding to the desired yarn setting sequence, a plurality of yarn supply tubes for supplying yarns of different color from corresponding yarn supply sources, a bed of yarn storage tubes for storing lengths of yarn, said yarn storage tubes having respective inlets and outlets, a distributor having inlets connected with respective supply tubes and outlets connected with respective storage tubes, said distributor being controllable to establish a yarn feeding path from a selected inlet to a selected outlet thereof, yarn feeding means including a clamp and a pneumatic launcher for each of said supply tubes, control means responsive to a signal from said record reader for selectively actuating the corresponding yarn feeding means to feed a yarn through a corresponding inlet of said distributor to a storage tube, yarn detector means near the outlet ends of said storage tubes, means responsive to said yarn detector means for closing said clamps and deenergizing said launchers to stop the conveying of detected yarns respectively, cutting means near the inlet ends of said storage tubes, and control means for actuating said cutting means, actuating said distributor to another outlet thereof and actuating said reader to yield a successive signal after the storage of a yarn length in a respective storage tube.

23. Apparatus in accordance with claim 22 in which the last-mentioned control means is responsive to said yarn detector means.

24. Apparatus for setting yarns for Axminster loom-spools and the like in accordance with a record of the required setting order which comprises a record reader, means for indexing said reader to successive positions to yield respective signals representing desired color yarns, a plurality of yarn supply tubes for supplying yarns of different color from corresponding yarn supply sources, a bed of yarn storage tubes for storing lengths of yarn, said yarn storage tubes having respective inlets and outlets, a distributor having inlets connected with respective supply tubes and outlets connected with respective storage tubes, means for indexing said distributor to render the outlets thereof effective sequentially, yarn feeding means including a clamp and a pneumatic launcher for each of said supply tubes, control means responsive to a signal from said record reader for selectively actuating the corresponding yarn feeding means to feed a yarn through a corresponding inlet of said distributor to a storage tube, a yarn detector near the outlet ends of said storage tubes, means for indexing said yarn detector to successive storage tubes, cutting means near the inlet ends of said storage tubes, and control means responsive to said yarn detector for closing the clamp and deenergizing the launcher feeding the detected yarn and actuating said cutting means and said reader, distributor and yarn detector indexing means.

25. Apparatus for setting yarns for Axminster loom-spools and the like in accordance with a record of the required setting order which comprises a record reader for deriving simultaneously a plurality of signals representing corresponding color yarns to be set substantially simultaneously, means for indexing said reader to successive positions to yield respective sets of signals, a plurality of sets of yarn supply tubes, a plurality of sets of yarn storage tubes, said yarn storage tubes having respective inlets and outlets a plurality of distributors each having inlets connected with a respective set of supply tubes and outlets connected with a respective set of storage tubes, means for indexing said distributors to render the respective outlets thereof effective sequentially, yarn feeding means including a clamp and a pneumatic launcher for each of said supply tubes, control means responsive to signals from said reader for electively actuating corresponding yarn feeding means to feed yarns through corresponding inlets of said distributors to respective outlets thereof, a plurality of yarn detectors near the outlet ends of respective sets of storage tubes, means for indexing said yarn detectors to successive storage tubes in respective sets, cutting means near the inlet ends of respective sets of storage tubes, control means responsive to said yarn detectors for closing the clamps and deenergizing the launchers feeding respective detected yarns and for actuating said cutting means, and control means responsive to the joint actuation of said yarn detectors for actuating said reader, distributor and yarn detector indexing means.

26. Apparatus for setting yarns for Axminster loom-spools and the like which comprises a yarn supply source, a plurality of yarn storage means for storing lengths of yarn in predetermined order, a distributor having an inlet connected with said yarn supply source and a plurality of outlets connected with respective yarn storage means, means for sequentially establishing yarn feeding paths from said inlet of the distributor through selected outlets thereof to corresponding yarn storage means, and means for cutting the yarn fed to a storage means prior to the next feeding thereof.

27. Apparatus for setting yarns for Axminster loom-spools and the like in accordance with a record of the required setting order which comprises record reading means for deriving successive signals corresponding to the desired setting positions of a given yarn, a supply source of said yarn, a plurality of yarn storage means for storing lengths of yarn in predetermined order, a distributer having an inlet connected with said yarn supply source and a plurality of outlets connected with respective yarn storage means, means for rendering said distributor outlets effective successively, and means responsive to said successive signals for feeding said yarn successively through selected distributor outlets to respective storage means.

28. Apparatus for setting yarns for Axminster loom-spools and the like in accordance with a record of the required setting order which comprises record reading means for deriving successive signals corresponding to the desired setting positions of a given yarn, a supply source of said yarn, a bed of yarn storage tubes for storing lengths of yarn, said yarn storage tubes having respective inlets, a distributor having an inlet connected with said yarn supply source and a plurality of outlets connected with said storage tubes respectively, means for rendering said distributor outlets effective successively, means responsive to said successive signals for feeding said yarn successively through selected distributor outlets to respective storage tubes, and cutting means near the inlet ends of said storage tubes for cutting the yarn after a length thereof has been stored and prior to the next feeding thereof.

References Cited in the file of this patent

UNITED STATES PATENTS

| | | |
|---|---|---|
| 1,789,537 | Thomas | Jan. 20, 1931 |
| 2,126,634 | Homan | Aug. 9, 1938 |

FOREIGN PATENTS

| | | |
|---|---|---|
| 413,880 | Great Britain | July 26, 1934 |